UNITED STATES PATENT OFFICE.

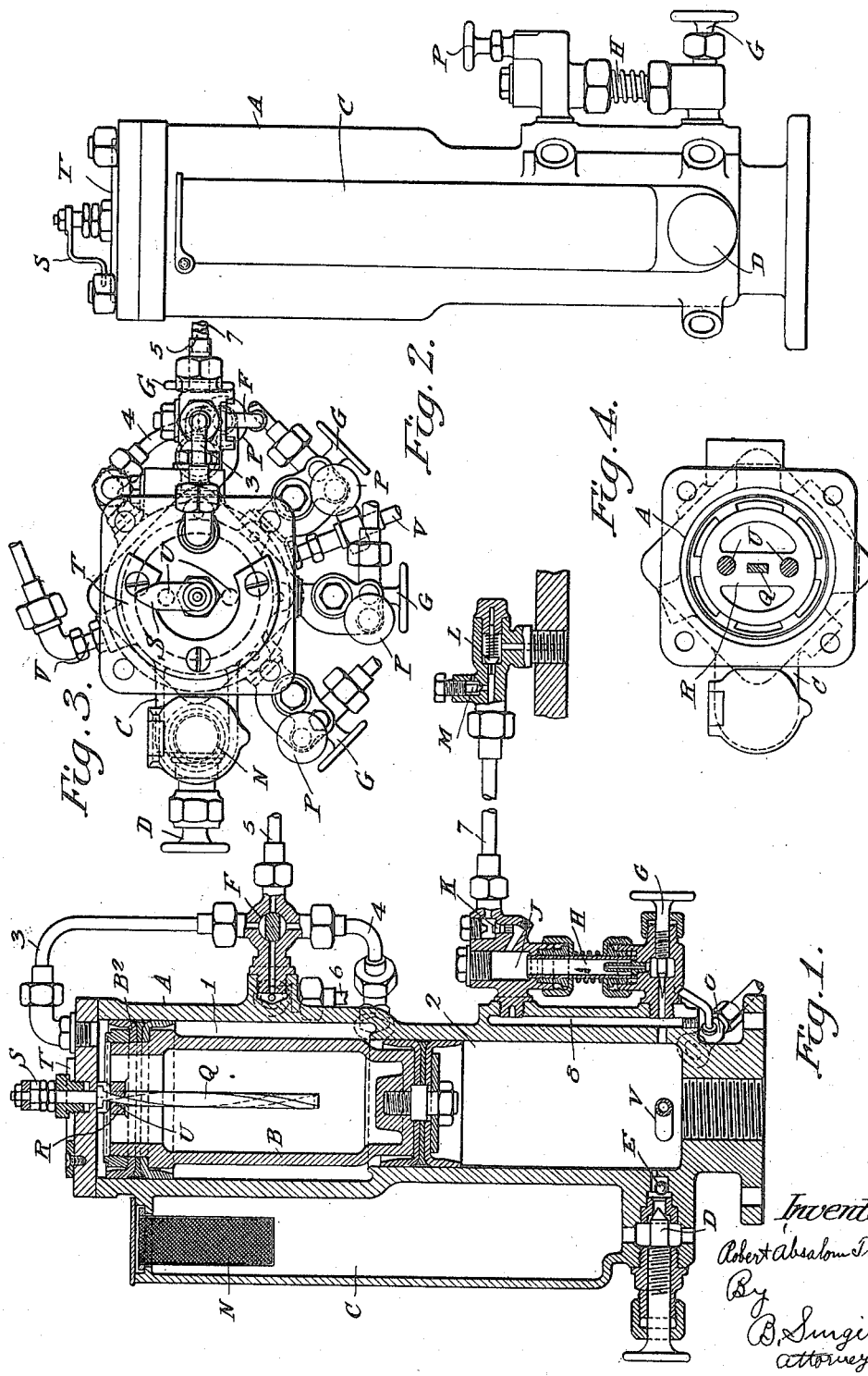

ROBERT ABSALOM THOM, OF MANCHESTER, ENGLAND.

SIGHT-FEED PRESSURE-LUBRICATOR.

1,202,608.  Specification of Letters Patent.  Patented Oct. 24, 1916.

Original application filed May 31, 1916, Serial No. 100,956. Divided and this application filed August 28, 1916. Serial No. 117,372.

*To all whom it may concern:*

Be it known that I, ROBERT ABSALOM THOM, a subject of the King of Great Britain, and resident of Manchester, England, have invented certain new and useful Improvements in Sight-Feed Pressure-Lubricators, of which the following is a specification.

This invention relates to improvements in lubricators and has for its object to provide a lubricator for use on locomotive and other situations which will not depend for its action upon pumps or other mechanical devices and which will insure a constant and steady delivery of the lubricant to the part or parts to be lubricated at a desired pressure and in quantities which can be controlled and observed by the operator.

In the accompanying drawings I have illustrated practical embodiments of my invention particularly designed for use on locomotives, but it will be understood that I do not confine myself to these specific constructions which can be varied in many ways within the limits of my claims.

In these drawings Figure 1 is a sectional elevation and Fig. 2 a side elevation of one form of lubricator. Fig. 3 is a plan showing the oil feed and steam connections. Fig. 4 is a sectional plan showing the piston head.

Referring to these drawings, A designates a cylinder having two diameters to form two chambers 1 and 2 respectively of which the larger 1 has a cross-sectional area of say about one and a half times that of the smaller chamber 2. A plunger B is fitted in the smaller chamber 2 and near its outer or upper extremity carries a piston $B^2$ suitably packed to fit the diameter of the larger chamber. The smaller chamber 2 is supplied with oil or other lubricant from a reservoir C communicating with it by a passage controlled by a regulating valve D and also fitted with a ball valve E, or a clack or other suitable form of non-return valve. The opposite ends of the larger chamber 1 are connected by pipes or passages 3 and 4 to a four way cock F which has a third branch 5 connected to the steam space of the boiler or other source of fluid pressure by a coil of pipe (not shown) which acts as a surface condenser to prevent overheating the lubricator or lubricant while the fourth branch 6 leads to the atmosphere. The ports in the plug of the four way cock F are so arranged, as clearly shown in Fig. 1, that fluid pressure can be admitted to either the top of the piston $B^2$ or to the annular space below it, while the other side of the plug opens the branch 6 to the atmosphere, or pressure can be shut off from both sides by simultaneously closing the branches 5 and 6 leading from the boiler and to the atmosphere respectively.

When the piston is subjected to the steam pressure from the boiler it is forced downward and so forces the plunger B down on the oil in the lubricating chamber 2 which will then be under a pressure approximately fifty per cent. greater than the boiler pressure, and, on opening a regulating valve G in the outlet from the lubricating chamber 2, oil will be delivered under this pressure through the sight feed glass H, passing in the form of a globule through the glass into a delivery chamber J whence it is forced out through a non-return valve K into a pipe or passage 7 leading to the cylinder, steam pipe, or steam chest to be lubricated. At or near the far end of this delivery pipe or passage 7 where the oil enters the place or part to be lubricated, is fitted a non-return valve L suitably spring-loaded to a pressure greater than that of the atmosphere to prevent oil being sucked out of the delivery pipe or passage 7 when steam is shut off. A test plug M is inserted, as shown in Fig. 1, in order to ascertain when the delivery pipe 7 is fully charged with lubricant. The oil is supplied to the reservoir C through a gauze or other suitable strainer N and the oil and leakage water can be drawn off as and when required through a drain cock O connected to the lubricating chamber 2.

To fill the lubricator and get it ready for work the reservoir valve D is opened and the four way cock F is actuated to admit steam pressure above the piston $B^2$ and drive the plunger B down to the bottom of its stroke. The regulating valve G on the delivery from the lubricating cylinder 2 is then closed, the oil reservoir C is filled with water and the four way cock F turned to admit steam to the annular space below the piston B², thereby causing the plunger B to rise to the top of its stroke drawing water out of the reservoir C into the lubricating chamber 2. The reservoir valve F is then closed, the delivery regulating valve G is opened, and the four way cock F is again actuated to cause the plunger to descend in the lubricating chamber 2, thus forcing out the water and filling the sight feed glass H and the delivery pipe or passage 7, the test plug M being opened to permit surplus water to escape. When the plunger B has reached the bottom of its stroke the delivery regulating valve is closed, the reservoir is filled with oil, the reservoir valve D opened, and the four way valve F turned to cause the plunger B to rise and fill the lubricating chamber 2 with oil from the reservoir C, and when the plunger B has reached the top of its stroke, the reservoir valve D is closed, the delivery regulating valve G opened, and the four way cock F actuated to reverse the movement of the plunger B. The oil will then be forced out of the lubricating chamber 2, passing in the form of globules up the sight feed glass H and be forced through the non-return valve K into the delivery pipe or passage 7. Then the delivery regulating valve G is closed and the test plug M screwed down, leaving the delivery pipe or passage 7 charged with oil and the lubricator under pressure and ready for work.

To start the lubricator it is necessary only to regulate the delivery by opening the regulating valve G sufficiently to deliver the required number of drops or globules, and to leave the four way cock F in position to force the plunger B constantly downward.

To simplify description I have mentioned only one delivery regulating valve G, sight feed glass H and connections, but I wish it to be clearly understood that I propose to employ any suitable number such as four or even eight regulating valves and sight feed glasses, any or all of which may be in or out of action. In the plan view, Fig. 3, I show a lubricator having four regulating valves with sight feed glasses and connections all controlled and operated by one four way valve F and intensifier.

It will be obvious that the process of charging the delivery pipes or passages with oil is required only when the lubricator is first set to work. When empty the lubricating chamber can be re-charged by simply operating the valves D and G and four way cock F.

The improved lubricator as above described is a true forced feed arrangement working with a constantly charged delivery pipe or passage 7 through a loaded delivery valve L close to the cylinder or other part to be lubricated.

Equality of distribution is insured by the several sight glasses H. A broken glass can be quickly removed and a fresh glass substituted by shutting its respective delivery regulating valve G. Any blowing back is prevented by the two non-turn valves K and L in its delivery pipe or passage.

A by-pass 8 is provided leading from the lubricating chamber 2 to the space above the non-return valve K above the sight feed glass H, the supply of lubricant in this space being controlled by a hand operated valve P so as to cut out the sight glass H and enable the oil to be short circuited from the lubricating chamber 2 to the delivery pipe or passage 7, and thus enabling the engine driver to renew the glass at leisure.

For the purpose of indicating the quantity of oil contained in the lubricator I employ a spindle G fitted in a steam tight gland in the cover of the lubricator body and free to rotate therein. A helix or Archimedian thread is formed on the spindle G and this helical portion passes through a bridge or cross bar R fixed on the top of the plunger B so that as the plunger descends the spindle G is rotated and a pointer S thereon moving over the surface of a graduated dial T indicates, by the position of the plunger B, the quantity of oil remaining in the lubricating chamber 2.

The rotation of the plunger B is prevented by pins U projecting from the cylinder cover and passing through holes in the bridge or cross bar R.

To keep the lubricant fluid I prefer to employ a steam warming pipe V in the lubricating chamber 2.

The specific example of my invention hereinbefore described is described for use with steam pressure, but it will be understood that other fluid pressure may be utilized so long as the pressure operating to discharge the lubricant is higher than the pressure at the part to be lubricated. It will be at once apparent for instance that air pressure may be utilized and in the case of locomotives fitted with Westinghouse brakes the pressure would be readily available.

What I claim and desire to secure by Letters Patent is:—

1. A lubricator comprising a storage vessel for lubricant, a differential cylinder cast integral with the storage vessel, a right angles passage in the casting connecting the lower end of the storage vessel with the lower smaller end of the differential cylinder, a hand operated needle valve for controlling said passage, a non-return valve, interposed between the needle valve and the inlet orifice to the differential cylinder, a second outlet passage in said casting leading from the differential piston operating in the differential cylinder to the part to be lubricated, a differential piston operating in the differential cylinder, a source of fluid pressure, means for conducting said fluid pressure to either side of the large area of the differential piston and means for controlling the direction of flow of fluid pressure to operate the piston in either direction at will substantially as specified.

2. A lubricator comprising a storage vessel for lubricant, a differential cylinder cast integral with the storage vessel, a right angles passage in the casting connecting the lower end of the storage vessel, with the lower smaller end of the differential cylinder, a hand operated needle valve for controlling said passage, a non-return valve, interposed between the needle valve and the inlet orifice to the differential cylinder, a second outlet passage in said casting leading from the differential cylinder to the part to be lubricated, a sight glass interposed between the outlet passage and the part to be lubricated, a differential piston operating in the differential cylinder, a source of fluid pressure, means for conducting said fluid pressure to either side of the larger area of the differential piston and means for controlling the direction of flow of fluid pressure to operate the piston in either direction at will substantially as specified.

3. A lubricator comprising a storage vessel for lubricant, a differential cylinder cast integral with the storage vessel, a right angles passage in the casting connecting the lower end of the storage vessel with the lower smaller end of the differential cylinder, a hand operated needle valve for controlling said passage, a non-return valve interposed between the needle valve and the inlet orifice to the differential cylinder, a second outlet passage in said casting leading from the differential cylinder to the part to be lubricated, a valve for regulating the supply of lubricant to the sight glass, a differential piston operating in the differential cylinder, a source of fluid pressure, means for conducting said fluid pressure to either side of the larger area of the differential piston and means for controlling the direction of flow of fluid pressure to operate the piston in either direction at will substantially as specified.

4. A lubricator comprising a storage vessel for lubricant, a differential cylinder cast integral with the storage vessel, a right angles passage in the casting connecting the lower end of the storage vessel with the lower smaller end of the differential cylinder, a hand operated needle valve for controlling said passage, a non-return valve, interposed between the needle valve and the inlet orifice to the differential cylinder, a second outlet passage in said casting leading from the differential cylinder to the part to be lubricated, a sight glass interposed between the cylinder casting and means for cutting the sight glass out of circuit and diverting the lubricant through a by-pass passage to the part to be lubricated, a differential piston operating in the differential cylinder, a source of fluid pressure, means for conducting said fluid pressure to either side of the larger area of the differential piston and means for controlling the direction of flow of fluid pressure to operate the piston in either direction at will substantially as specified.

5. A lubricator comprising a storage vessel for lubricant, a differential cylinder cast integral with the storage vessel, a right angles passage in the casting connecting the lower end of the storage vessel with the lower smaller end of the differential cylinder, a hand operated needle valve for controlling said passage, a non-return valve, interposed between the needle valve and the inlet orifice to the differential cylinder, a second outlet passage in said casting leading from the differential cylinder to be lubricated, a non-return valve immediately adjacent the part to be lubricated, a differential piston operating in the differential cylinder, a source of fluid pressure, means for conducting said fluid pressure to either side of the larger area of the differential piston and means for controlling the direction of flow of fluid pressure to operate the piston in either direction at will substantially as specified.

6. A lubricator comprising a cast storage vessel for lubricant, a differential cylinder integral with the storage vessel casting, a passage in the casting leading from said storage vessel to the part of the differential cylinder of smaller diameter, a valve for controlling said passage, a second passage leading from the cylinder to the part to be lubricated, a needle valve for controlling said passage, a non-return valve immediately adjacent the part to be lubricated, a differential piston operating in the differential cylinder, a source of fluid pressure, means for conducting said fluid pressure to either end of the larger diameter of the differential cylinder, and means for controlling the direction of flow of the fluid pressure to operate the piston.

7. A lubricator comprising a cast storage vessel for lubricant, a removable filter closing the opening to said storage vessel, a differential cylinder integral with the storage vessel casting, a passage in the casting leading from said storage vessel to the part of the differential cylinder of smaller diameter, a valve for controlling said passage, a second passage leading from the cylinder to the part to be lubricated, a needle valve for controlling said passage, a non-return valve immediately adjacent the part to be lubricated, a differential piston operating in the differential cylinder, a source of fluid pressure, means for conducting said fluid pressure to either end of the larger diameter of
5 the differential cylinder, and means for controlling the direction of flow of the fluid pressure to operate the piston.

In testimony whereof I affix my signature in presence of two witnesses.

ROBERT ABSALOM THOM.

Witnesses:
ERNALD SIMPSON MOSELEY,
GEORGE WEAVER.

Copies of this patent may be obtained for five cents each, by addressing the "Commissioner of Patents, Washington, D. C."